(12) United States Patent
Iglesias et al.

(10) Patent No.: US 6,964,049 B2
(45) Date of Patent: Nov. 8, 2005

(54) SMART INTERNETWORKING OPERATING SYSTEM FOR LOW COMPUTATIONAL POWER MICROPROCESSORS

(75) Inventors: Lino Iglesias, Caracas (VE); Roger Pinate, Caracas (VE); Antonio Mugica, Boca Raton, FL (US); Paul Babic, Caracas (VE); Jeffrey Naveda, Colinas de Carrizal (VE); Dany Farina, Caracas (VE); Rodrigo Meneses, Caracas (VE); Salvador Ponticelli, Caracas (VE); Gisela Goncalves, Caracas (VE); Yrem Caruso, Caracas (VE)

(73) Assignee: Smartmatic Corporation, Boca Raton, FL (US)

( * ) Notice: Subject to any disclaimer, the term of this patent is extended or adjusted under 35 U.S.C. 154(b) by 850 days.

(21) Appl. No.: 09/682,086

(22) Filed: Jul. 18, 2001

(65) Prior Publication Data

US 2003/0018680 A1 Jan. 23, 2003

(51) Int. Cl.$^7$ ................................ G06F 9/46
(52) U.S. Cl. ............................ 718/107; 718/103
(58) Field of Search ............................ 718/1, 100–108

(56) References Cited

U.S. PATENT DOCUMENTS 4,123,795 A * 10/1978 Dean et al. .................. 718/103
4,943,913 A * 7/1990 Clark .......................... 711/206
5,745,758 A * 4/1998 Shaw et al. .................. 718/102
5,940,612 A * 8/1999 Brady et al. ................. 718/103

* cited by examiner

Primary Examiner—Lewis A. Bullock, Jr.
Assistant Examiner—Kenneth Tang
(74) Attorney, Agent, or Firm—Jeffrey Furr

(57) ABSTRACT

Low processing power microprocessors are cheap and represent a great solution for automation, control, basic signal processing and other problems. A microprocessor's intelligence derives from the program it executes. The Smart Internetworking Operating System (SIOS) is a multitasking operating system capable of operating in low processing power platforms, such as 8-bit microprocessors, SIOS supports rapid development of complete applications since task programming is based on SIOS instructions, instead of on the underlying microprocessor's native language. The SIOS instruction set allows the execution of both simple and complex operations, which speed up application development since programmers need not be concerned with the microprocessor-specific details, and can concentrate on developing intelligent operation routines according to the requirements of the problem at hand. SIOS provides support for the management of processor resources, memory, input and output ports, and internal peripherals, such as timers, ADCs and others.

2 Claims, 15 Drawing Sheets

Data Memory – Task Control Block

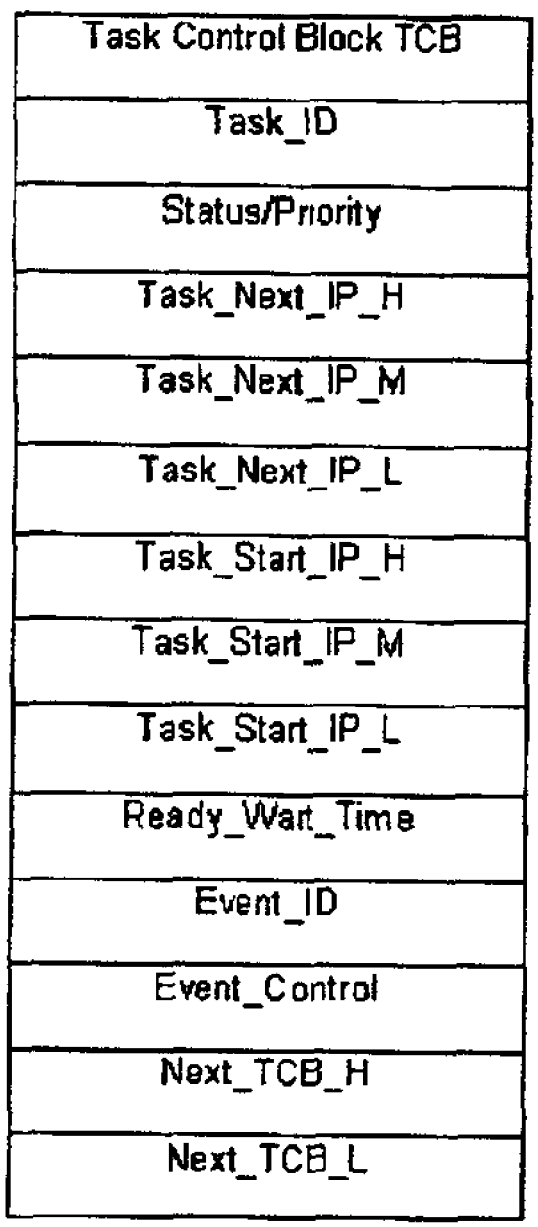
Fig. 1 - Data Memory – Task Control Block

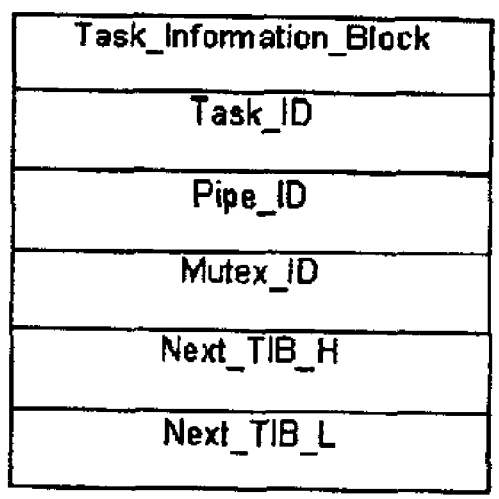
Fig 2 - Data Memory – Task Information Block

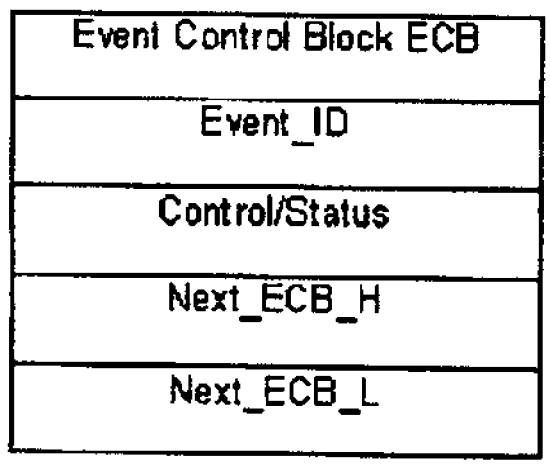
Fig 3 - Data Memory – Event Control Block

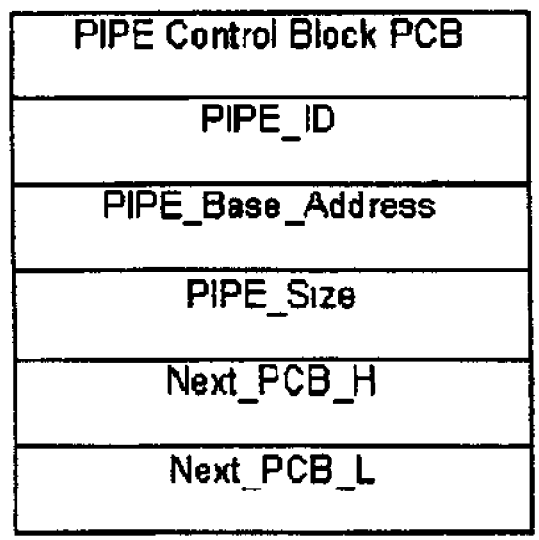
Fig 4 - Data Memory - Pipe Control Block

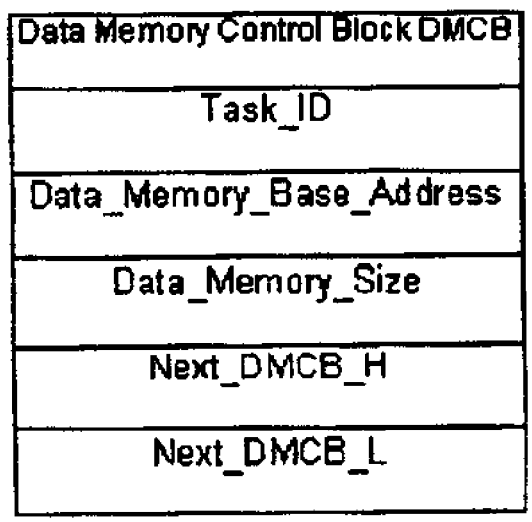
Fig 5 – Data Memory – Data Memory Control Block

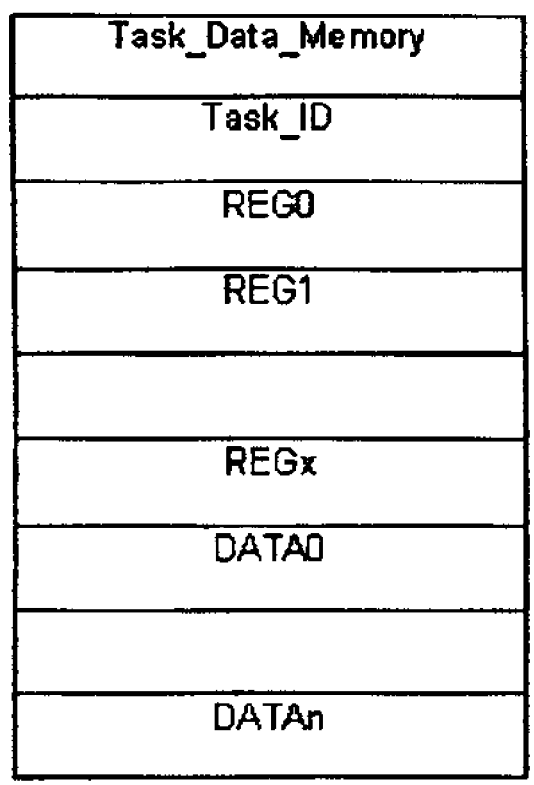
Fig 6 - Data Memory – Task Data Memory

| Port_Information_Block |
| --- |
| Asignation_Port_Mask_A |
| Asignation_Port_Mask_B |
| Asignation_Port_Mask_C |
| Asignation_Port_Mask_D |
| Asignation_Port_Mask_E |
| Asignation_Port_Mask_F |
|  |
| Input_Selection_Mask_A |
| Input_Selection_Mask_B |
| Input_Selection_Mask_C |
| Input_Selection_Mask_D |
| Input_Selection_Mask_E |
| Input_Selection_Mask_F |
|  |
| Idle_State_Mask_A |
| Idle_State_Mask_B |
| Idle_State_Mask_C |
| Idle_State_Mask_D |
| Idle_State_Mask_E |
| Idle_State_Mask_F |
|  |
| Idle_State_Mask_A |
| Idle_State_Mask_B |
| Idle_State_Mask_C |
| Idle_State_Mask_D |
| Idle_State_Mask_E |
| Idle_State_Mask_F |
|  |
| Change_State_A |
| Change_State_B |
| Change_State_C |
| Change_State_D |
| Change_State_E |
| Change_State_F |
|  |

Fig.7 - Data Memory – Port Information Block

| KERNEL control Registers |
|---|
| DM_Remainder_H |
| DM_Remainder_L |
| Max_Priority |
| Max_Wait_Time |
| Task_ID_Winner |
| IP_H |
| IP_M |
| IP_M |
| IP_L |
| DM_Pointer_H |
| DM_Pointer_L |
| TCB_Pointer_H |
| TCB_Pointer_L |
| ECB_Pointer_H |
| ECB_Pointer_L |
| DMCB_Pointer_H |
| DMCB_Pointer_L |
| TIB_Pointer_H |
| TIB_Pointer_L |
| PCB_Pointer_H |
| PCB_Pointer_L |
| Last_TCB_Pointer_H |
| Last_TCB_Pointer_L |
| Last_ECB_Pointer_H |
| Last_ECB_Pointer_L |
| Last_TIB_Pointer_H |
| Last_TIB_Pointer_L |
| Last_PIB_Pointer_H |
| Last_PIB_Pointer_L |
| Last_DMCB_Pointer_H |
| Last_DMCB_Pointer_L |

Fig 8 - Data Memory – Kernel Control Registers

| Task_Allocation_Table TAT |
|---|
| Task_Condition |
| Task_Start_IP_H |
| Task_Start_IP_M |
| Task_Start_IP_L |
| Task_Condition |
| Task_Start_IP_H |
| Task_Start_IP_M |
| Task_Start_IP_L |
| ⋮ |
| ⋮ |
| ⋮ |
| Task_Condition |
| Task_Start_IP_H |
| Task_Start_IP_M |
| Task_Start_IP_L |

Fig 9 - Program Memory – Task Allocation Table

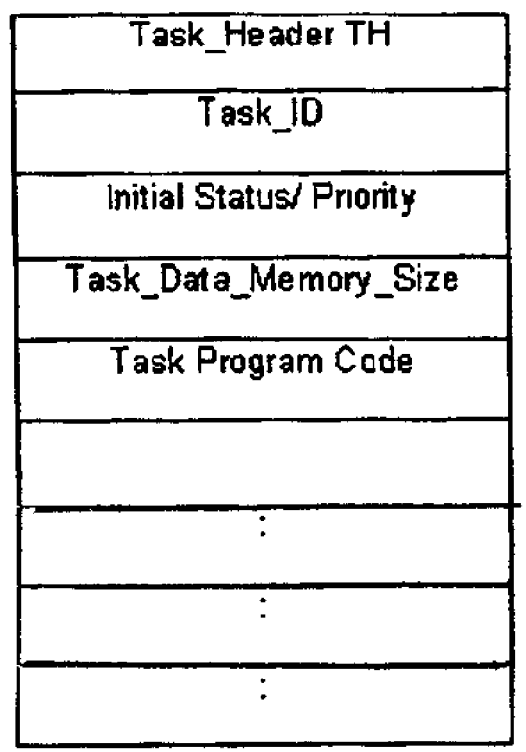
Fig 10 - Program Memory -- Task Header

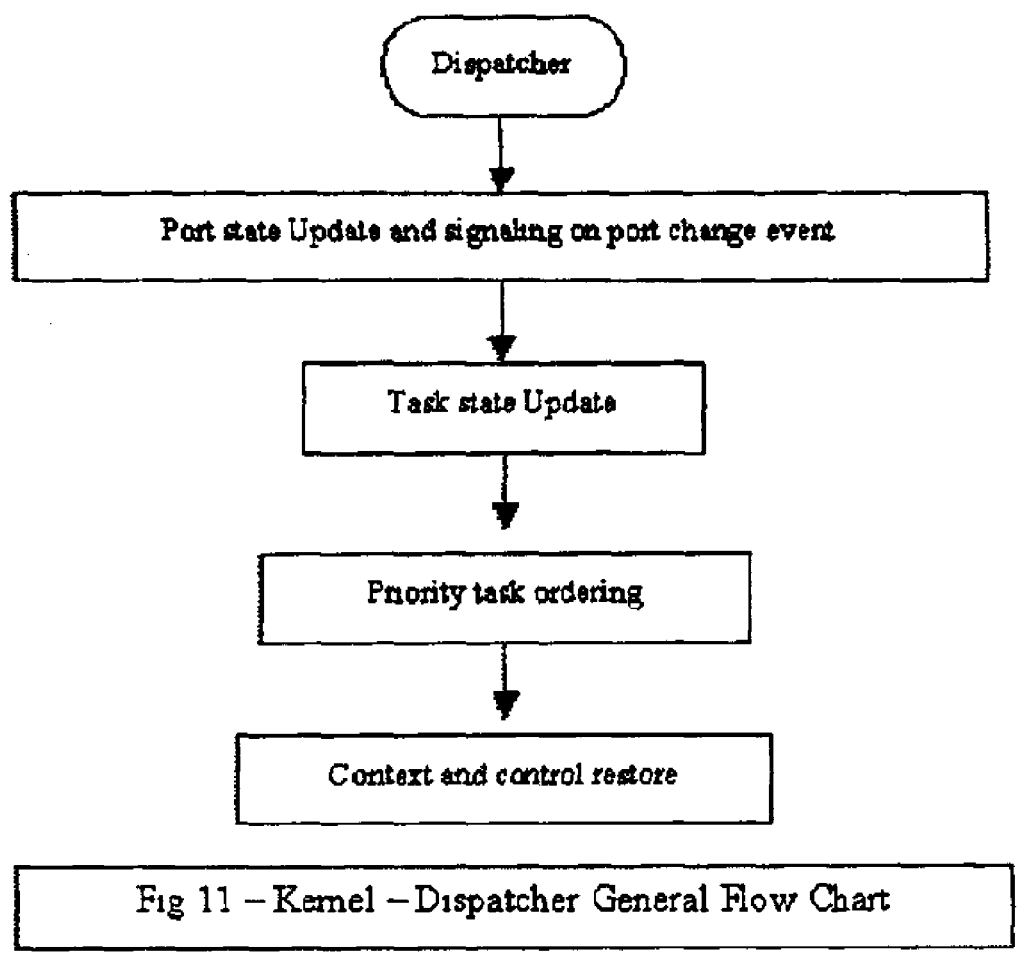

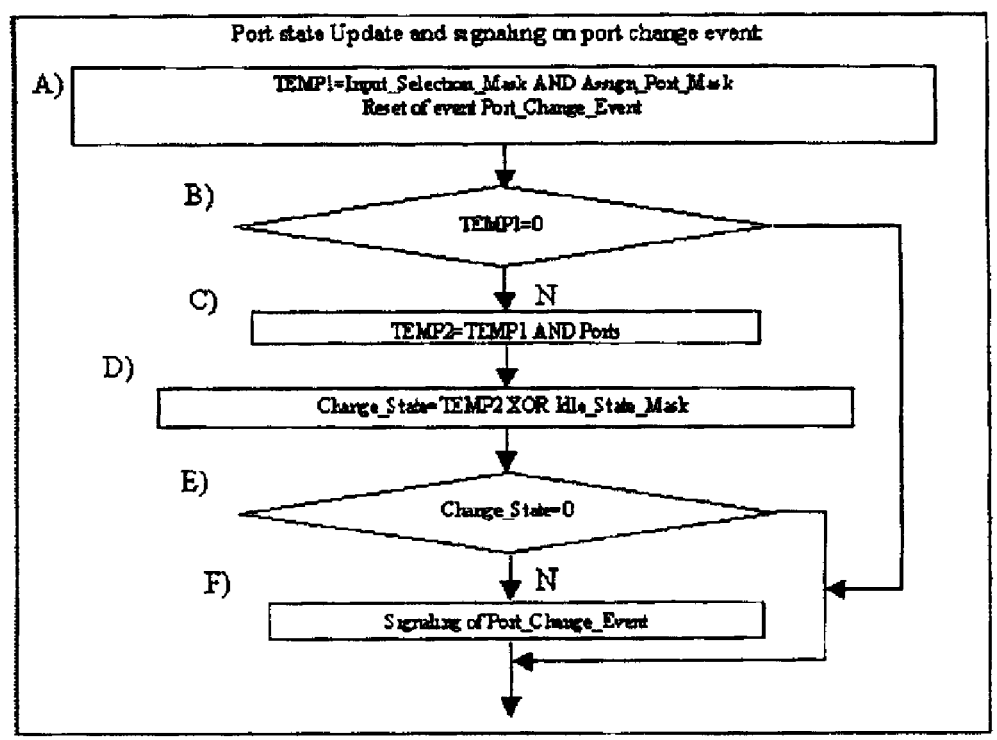
Fig 12 – Kernel – Port State Update

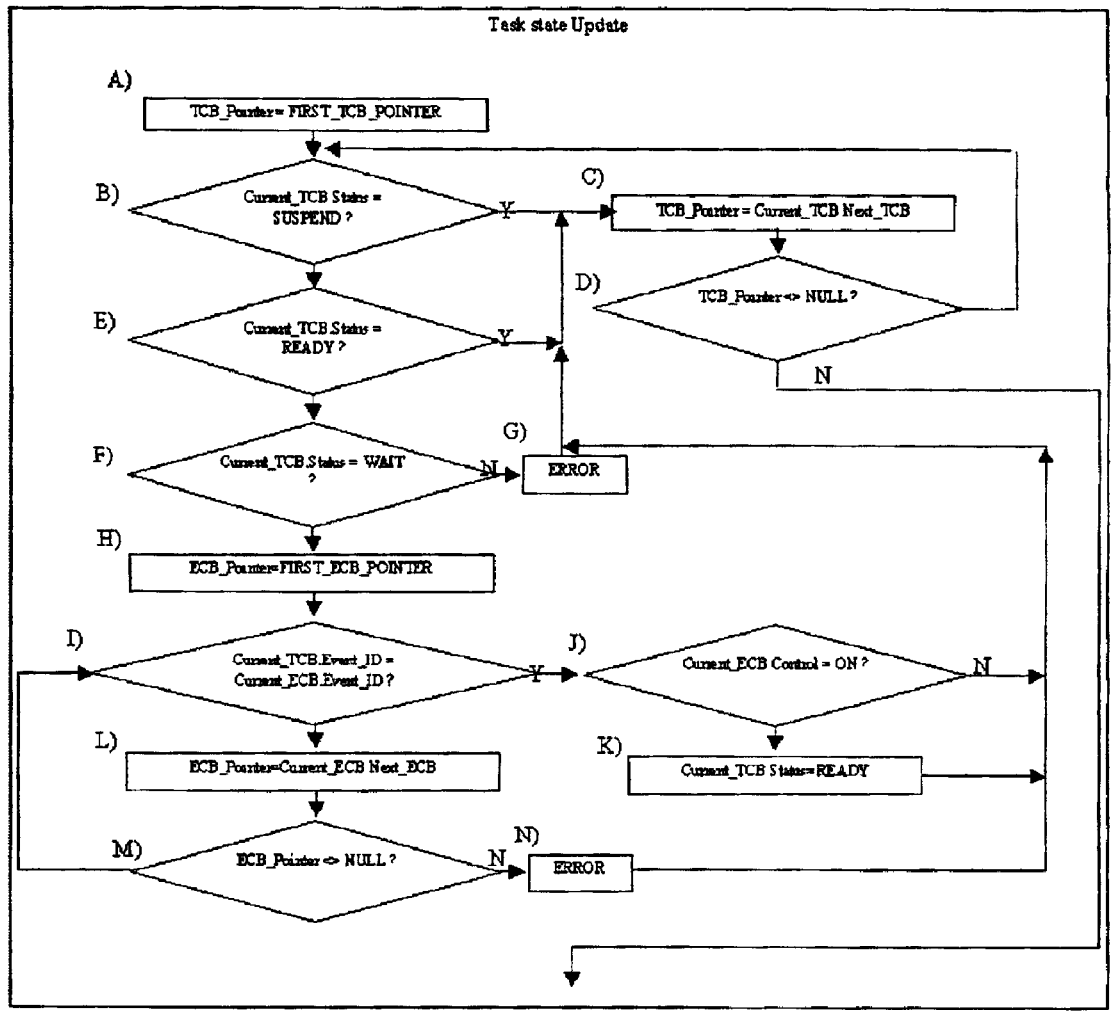
Fig 13 – Kernel – Task State Update

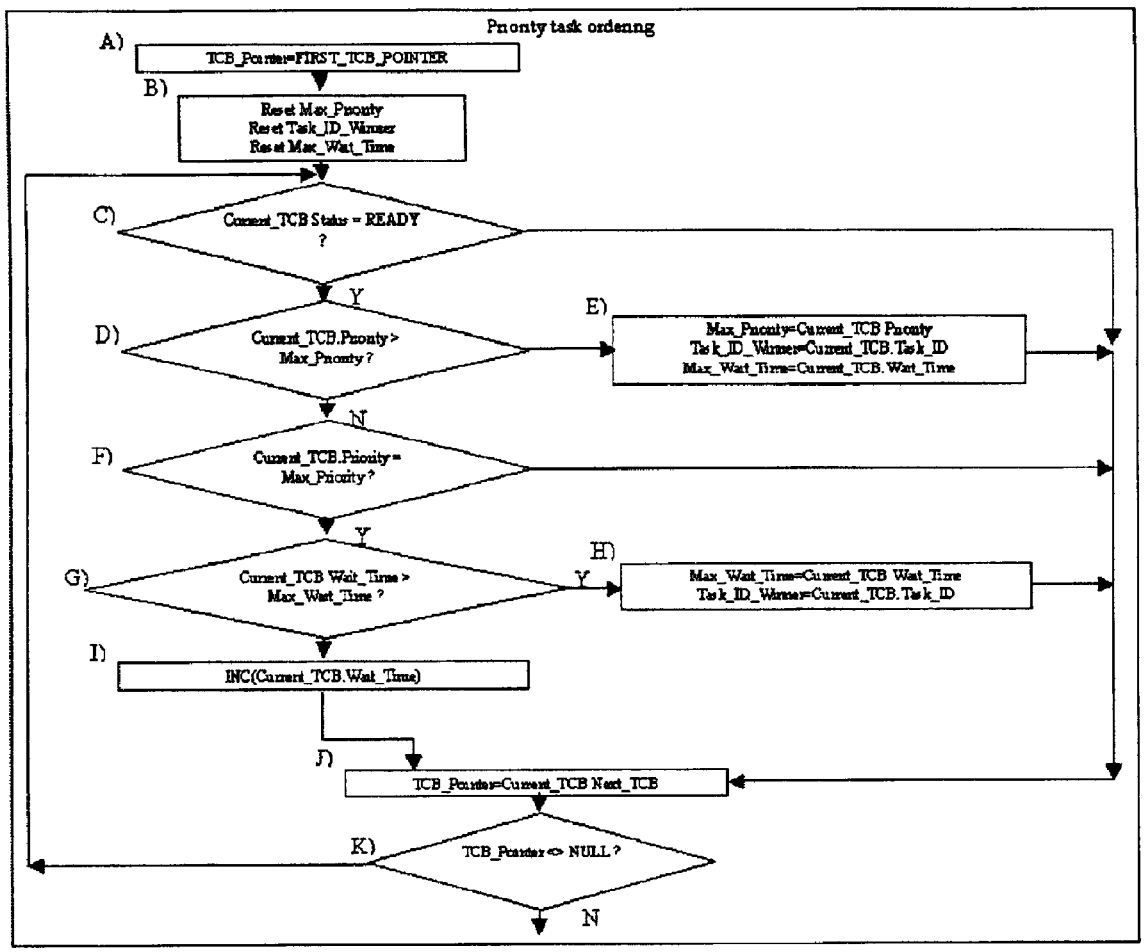
Fig 14 – Kernel – Priority Task Ordering

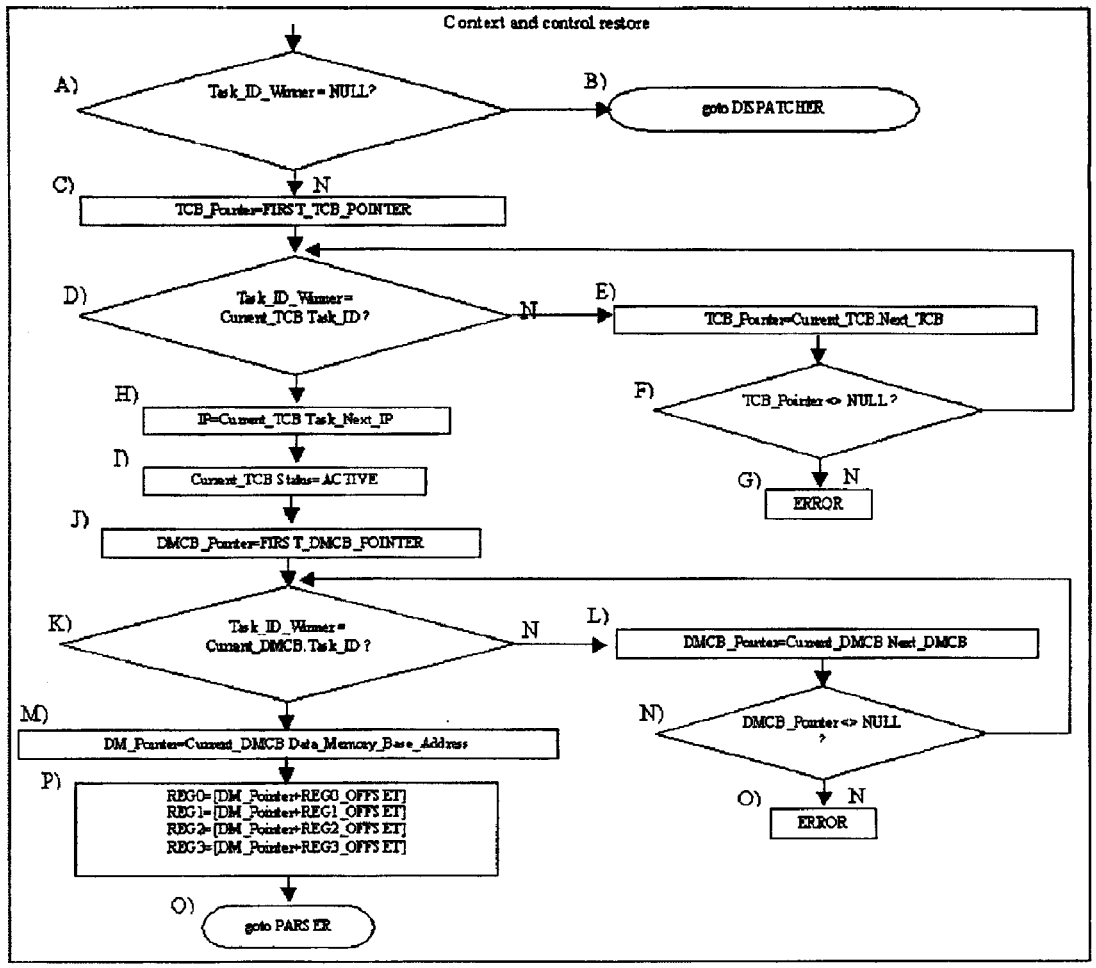
Fig 15 – Kernel – Context and Control Restore

SMART INTERNETWORKING OPERATING SYSTEM FOR LOW COMPUTATIONAL POWER MICROPROCESSORS

BACKGROUND OF INVENTION

1. Field of Invention

The present invention relates to the field of operating systems, specifically to multitasking operating systems embedded into low processing power microprocessors.

2. Prior Art

The need for tools that facilitate programming of microprocessors has motivated the development of several operating systems that, in general, accomplish the goal of decoupling program development from details specific to the management of microprocessor hardware. Existing operating systems have rapidly evolved from simple systems with little stability and resource management capability into complex and efficient systems capable of managing several simultaneous tasks and administrating a vast number of resources. Today, it is almost impossible to imagine the existence of a personal computer (PC) that executes applications without the help of an underlying operating system.

In addition, parallel to the evolution of PC operating systems, low-level architectures have also evolved in a way to allow the existence of low cost processors with processing speeds over 30 MHz, handling several Kbytes of RAM and ROM memory, etc., all in a very small packaging. These small processors, also called microprocessors, sometimes even include embedded peripheral devices within the casing of the microprocessor, making them ideal to solve automation, control, basic signal processing and other application at a very low cost.

Yet, despite the great advances in microprocessor technology, there has not been a similar evolution in the development of software for these devices. It is true that there exist numerous programming tools, such as assembler language compilers, high-level language compilers with assembler output, microprocessor native language development environments and others. However, there is a growing need for a tool that facilitates rapid and efficient application development.

The use of an embedded operating system may accelerate application development by dividing the microprocessor's operation management into specific function calls that lead to the accomplishment of these delicate tasks.

A common source of programming errors resides in the handling of microprocessor bits and registers. In operating system-based programming, the need for low-level handling is eliminated, since the operating system is now responsible of those tasks. Application development time is thus reduced.

Further, in some situations it is desirable that two or more tasks be executed concurrently, whether to be able to asynchronously handle several external events or other reasons. This requires the use of a computational resource that may allow a CPU to be shared among many tasks. Through programming based on a multitasking operating system (OS), executing multiple concurrent tasks would be as easy as developing each specific task and telling the OS to handle their execution. The idea of a multitasking operating system is not at all easy to realize, and no existing multitasking operating system supports the use of low processing power microprocessors comprising a basic architecture.

SUMMARY OF INVENTION

This invention presents the definition of the architecture for a multitasking operating system capable of executing on the majority of 8-bit microprocessors as well as in any microprocessor of higher processing power. Such operating system, called Smart Internetworking Operating System (SIOS), has been designed to manage. microprocessor resources, such as RAM/ROM memory, input/output ports, peripherals, and others. In addition, it is capable of handling the multiple tasks within a single central processing unit (CPU).

The definition exposed in this disclosure is based on the basic structures of the SIOS architecture, such as memory distribution, basis SIOS execution algorithms and the basic function prototypes that SIOS supports.

OBJECTS AND ADVANTAGES OF INVENTION

The following are several objects of the present invention

To described a valid architecture that facilitates the implementation of a Smart Internetworking Operating System (SIOS);

To provide a definition of the basic algorithms of the operation of SIOS;

To illustrate and provide conceptual bases, through examples, to allow the creation of new functions that SIOS may execute;

To provide an operating system that may be executed by low processing power and capacity microprocessors;

To provide a software platform that permits the easy portability of application program code among several microprocessor architectures, in which each microprocessor possesses a version of SIOS adapted to its architecture;

To provide a software platform that allows rapid development of microprocessor applications;

To provide a platform that allows the implementation of applications comprising multiple concurrent threads of execution in a single microprocessor.

The following are several advantages of the present invention:

SIOS is an operating system that supports low processing power microprocessors;

SIOS provides a software development platform for microprocessors in which program code may be ported among different microprocessors architectures;

SIOS makes it possible to implement multi-threaded applications in low processing power microprocessors;

SIOS supports the implementation of almost any application in a microprocessor with minimized development time, in which the limits of applications may be imposed by the intrinsic limitations of the underlying microprocessor resources (e.g., speed), and not be development time and difficulty of programming;

SIOS allows the development of applications in which associated tasks may operate independently of each other, while sharing the same execution time and hardware resources, such as memory, etc.

BRIEF DESCRIPTION OF DRAWINGS

FIG. 1 Data Memory—Task Control Block TCB: A block used to control the execution of each task, called Task Control Block (TCB). Every task comprises one such block, and all TCBs are arranged in a dynamic chain of TCBs.

FIG. 2 Data Memory—Task Information Block TIB: Task Information Blocks (TIBs) used to control events associated with a task. Every task comprises one such block, and all RIBs are arranged in a dynamic chain of TIBs.

FIG. 3 Data Memory—Event Control Block ECB: ECBs control the events a system must monitor. Every event comprises one such block. All ECBs are arranged in a dynamic ECB chain.

FIG. 4 Data Memory—Pipe Control Block PCB: PCBs control a task's communication Pipes. Each Pipe comprises one such block. All PCBs are arranged in a dynamic chain.

FIG. 5 Data Memory—Data Memory Control Block DMCB: DMCBs help manage the memory assigned to a task, and are arranged in a chain of DMCBs.

FIG. 6 Data Memory—Task Data Memory TDM: TDM blocks are data memory blocks associated with each task. A task's TDM stores its context on one TDM block before yielding CPU handling to the Kernel.

FIG. 7 Data Memory—Port Information Block: PIBs are special memory blocks used to handle a microprocessor's input and output ports.

FIG. 8 Data Memory—Kernel Control Registers: KCRs are registers used by the Kernel to store required operation data.

FIG. 9 Program Memory—Task Allocation Table: TATs are tables of pointers that accurately identify the beginning of the memory blocks associated with a task.

FIG. 10 Program Memory—Task Header: A task's program code section starts with a Task Header (TH), which provides basic information about the task.

FIG. 11 Kernel Dispatcher General Flow Chart: The general algorithm of the Dispatcher is described later, with the figures that illustrate every stage in the general algorithm.

FIG. 12 Kernel Port State Update: This control block is the first step of four that the Dispatcher executes before yielding control to the active task. This subprocess carries out reading and verification of a microprocessor's input ports to set up port events, which can be signaled when the state of an input port changes.

FIG. 13 Kernel Task State Update: This control block is the second step that the Dispatcher executes before yielding control to the active task. This subprocess carries out reading and verification of events to update the state of tasks on the WAIT state and switch them to the READY state if their expected event is signaled.

FIG. 14 Kernel Priority Task Ordering: This control block is the third step of four that the Dispatcher executes before yielding control to the active task. This subprocess selects the task in the READY state that is to be switched to the ACTIVE state.

FIG. 15 Kernel Context and Control Restore: This control block is the last step that the Dispatcher executes before yielding control to the active task. This subprocess executes the restoration of all context variables associated with the active task, and yields CPU control to the Parser, which continues the execution of the active task's instructions.

DETAILED DESCRIPTION

DETAILED DESCRIPTION OF DRAWINGS FIG. 1 Data Memory—Task Control Block TCB: This Data Memory block, called TCB, is used in the execution of each task. Every task comprises one such block. All TCBs are arranged in a chain of TCBs, and contain the following fields: Task_ID: Task Identifier, contains the identifier of the task who owns a TCB. This field is initialized when a task is installed into the Kernel's line of execution, and is never modified.

Status/Priority: Contains the task's state and priority information. Bit<7..6> correspond to the state. Bit <5..0> correspond to the priority. A task's priority is fixed and is obtained from the Task Header when the task is installed on the Kernel's line of execution. The state may be one of the following: 00 for ACTIVE, 01 for WAITING, 10 for READY, or 11 for SUSPEND.

Task_Next_IP: Task Next Instruction Pointer is a set of three bytes that store the pointer to Program Memory where the next SIOS instruction associated with the task that owns the TCB resides. Bytes are assigned in the order of High, Medium and Low, where Low byte is the least significant byte, and High byte is the most significant. This pointer is updated every time a task yields CPU control to the Kernel.

Task_Start_IP: Task Start Instruction Pointer is a set of three bytes that contain the pointer to Program Memory where the first SIOS instruction associated with the task that owns the TCB resides. Bytes are assigned in the order of High, Medium and Low, where Low byte is the least significant byte, and High byte is the most significant. This pointer is installed in the Kernel's line of execution with the value indicated by the Task Header, and is never modified.

Ready_Wait_Time: Task waiting time in Ready State, byte that contains the counter of how many times a READY task has lost the priority competition. This value is updated by the Kernel.

Event_ID: Event Identifier contains the event identifier for which a task is waiting to switch from the WAIT to the READY state. This value is updated when the task wishes to wait for an event.

Event_Control: Event Control byte contains the event control value that an event must display so that it is assumed as active and a task may continue operation. This value is updated when a task starts its wait for an event.

Next_TCB: Next Task Control Block Pointer is a set of two bytes that contain the pointer to Data Memory of the next TCB in the chain of TCBs. If NULL, it means that there are not other TCBs on the chain. Byte order is big-endian (i.e., the first byte is the most significant byte, and the last is the least significant byte). This value is updated by the Kernel when the current TCB is the last on the chain and a new TCB is created.

FIG. 2 Data Memory—Task Information Block TIB: A TIB is used to control the events associated with a task. Every task comprises one such block. A TIB comprises the following fields: Task_ID: Task Identifier contains the identifier corresponding to the task that owns a TIB. This field is initialized when the TIB is created, when the task is installed in the Kernel's line of execution, and is never modified.

Pipe$_{13}$ID: Pipe Identifier contains a pointer to the Pipe that a task uses for communication purposes. If NULL, it means that task has not been assigned a Pipe. This field is initialized when a task requests that a Pipe be assigned to it.

Mutex_ID: Mutual Exclusion Identifier contains the identifier of the mutually exclusive event (Mutex) that a task owns. If NULL, no mutex has been assigned to the task. This field is initialized when a task requests that a mutex be assigned to it.

Next_TIB: Next Task Information Block Pointer is a set of two bytes that contain a data memory pointer to the next TIB in the TIB chain. If NULL, it means no next TIB exists in the TIB chain. Byte order is big-endian. This value is updated by the Kernel when the current TIB is the last on the TIB chain and a new TIB is created.

FIG. 3 Data Memory—Event Control Block ECB: This block is used for control of events that the system is to monitor. Each event comprises on such block. An ECB consists of the following fields: Event_ID: Event Identifier contains the identifier of the event being expected by a task so that it can switch from the WAIT to the READY task state. This field is initialized when an event is created and is never modified.

Control/Status: An event's Control & status contains information about the event, whether the event is signaled or not, and other event data. This field is updated by the task that controls the event. The Kernel watches this field to decide whether an event has been signaled by comparing it with the event's control byte Event_Control within the TCB.

Next_ECB: Next Event Control Block Pointer is a set of two bytes that contain the data memory pointer to the next ECB in the ECB chain. If NULL, it means there is no next ECB in the chain. Byte order is big-endian. This value is updated by the Kernel when the current ECB is the last on the ECB chain and a new ECB is created.

FIG. 4 Data Memory—Pipe Control Block PCB: The PCB is used for Pipe control, and there is one PCB for each existing Pipe on the PCB chain. The PCB contains the following fields: Pipe_ID: Pipe Identifier contains the identifier of the Pipe created on memory. This field is initialized when the Pipe is created and is never modified.

Pipe_Base_Address: Pipe Data Memory Base Address is a data memory pointer to the first byte on the Pipe. This field is initialized when the Pipe is created and is never modified. Byte order is big-endian.

Pipe_Size: Pipe Size in bytes, contains the number of data memory bytes that a Pipe occupies. This field is initialized when the Pipe is created and is never modified.

Next_PCB: Next Pipe Control Block Pointer is a set of two bytes that contain a data memory pointer to the next PCB in the chain of PCBs. If NULL, it means there is no next PCB on the chain. Byte order is big-endian. This value is updated by the Kernel when the current PCB is the last on the PCB chain and a new PCB is created.

FIG. 5 Data Memory—Data Memory Control Block DMCB: A DMCB is used to manage the memory assigned to each task. DMCBs are arranged in a chain of DMCBs, in which each DMCB contains the following fields: Task_ID: Task Identifier contains the identifier of the task that owns the DMCB. This field is initialized when the block is created, when the task is installed on the Kernel's line of execution, and is never modified.

Data_Memory_Base_Address: Task Data Memory Base Address is a data memory pointer to the first byte in the memory block assigned to a task. These bytes are initialized when Task Memory Data is assigned and are never modified. Byte order is big-endian.

Data_Memory_Size: Task Data Memory Size in bytes, contains the number of data memory bytes that the assigned memory block takes up. This field is initialized when the block is created and is never modified.

Next_DMCB: Next Task Data Memory Control Block Pointer is a set of two bytes that contains a data memory pointer to the next DMCB in the DMCB chain. If NULL, it means no next DMCB exists. Byte order is big-endian. This value is updated by the kernel when the current DMCB is the last DMCB on the DMCB chain and a new DMCB is created.

FIG. 6 Data Memory—Task Data Memory TDM: Every task comprises a data memory block containing Task Data Memory (TDM) to enable it to store the context registers before yielding control to the Kernel, and the registers required for regular operation. TDMs contain the following fields:—Task_ID: Task Identifier contains the identifier of the task that owns this TDM. This field is initialized when the block is created, when the task is installed on the Kernel's line of execution, and is never modified.

REGx: task context register. This may be a STATUS register of the ALU, an INDIRECTION register, a bank selection register, or other, and contains the value of the REGx before yielding control to the Kernel. This value is accordingly recovered from this location after control is resumed. There are as many REGs as required by the system for successful context change.

DATAn: task data registers. There are as many assigned registers as the task requested when it was installed on the Kernel's line of execution.

FIG. 7 Data Memory—Port Information Block: PIBs are special data memory blocks used for handling of microprocessor input and output ports. They contain the following fields: Assignation_Port_Mask: Mask comprising a set of bytes that contain bitwise information of microprocessor inputs/outputs (I/Os) assigned to tasks. If the I/O bit is HIGH, it means that the I/O has been assigned to a task. If the bit is LOW, it is free to be assigned to a task. There are as many bytes in the mask as there are data bytes provided for I/Os by the microprocessor. Byte order is little-endian (i.e., the first byte is the least significant whereas the last byte is the most significant).

Input_Selection_Mask: Mask comprising a set of bytes that contain bitwise information of the direction of communications in I/Os. If the bit is HIGH, the I/O is being used as input and must be watched to verify that it generates a port event. Otherwise, it is being used as output and does not have to be watched. There are as many bytes in the mask as there are data bytes provided for I/Os by the microprocessor. Byte order is little-endian.

Idle_State_Mask: Mask comprising a set of bytes that contain bitwise information about the natural state of microprocessor I/O bits. If a bit is HIGH, it means that a current LOW value must generate the port event. If a bit is LOW, it means that a current HIGH value must generate the port event. There are as many bytes in the mask as there are data bytes provided for I/Os by the microprocessor. Byte order is little-endian.

Change_State: contains a set of bytes that contain bitwise information related to a change in the value of the microprocessor's I/O bits. If the bit is HIGH, it means that a change has occurred in such bit. If a bit is LOW, a change in such bit has not occurred. There are as many bytes in the mask as there are data bytes provided for I/Os by the microprocessor. Byte order is little-endian.

FIG. 8 Data Memory—Kernel Control Registers: The Kernel requires a set of information storage registers for successful operation. This block of data memory contains the following fields: DM_Remainder: Free Data Memory Remainder, contains the number of free bytes in data memory. Every time a task is assigned a memory block, this counter is decreased. Byte order is big-endian.

Max_Priority: register that stores the maximum priority assigned to a task used in the process of searching for the READY task with highest priority.

Max_Wait_Time: register that stores the maximum wait time associated with a task. This is used in the process of searching for the READY task with the highest priority.

Task_ID_Winner: Identifier of the READY task of highest priority.

IP: Instruction Pointer, pointer to program memory that contains the current instruction that is to be decoded by the Parser. Byte order is big-endian.

DM_Pointer Memory Pointer. Byte order is big-endian.

TCB_Pointer: Task Control Block Pointer contains a data memory pointer to the location of the current TCB. Byte order is big-endian.

ECB_Pointer: Event Control Block Pointer contains a data memory pointer to the location of the current ECB. Byte order is big-endian.

DMCB_Pointer: Data Memory Control Block Pointer contains a data memory pointer to the location of the current DMCB. Byte order is big-endian.

TIB_Pointer: Task Information Block Pointer contains a data memory pointer to the current TIB. Byte order is big-endian.

PCB_Pointer: Pipe Control Block Pointer contains a data memory pointer to the location of the current PCB. Byte order is big-endian.

Last_TCB_Pointer: Last Task Control Block Pointer contains a data memory pointer to the location of the last TCB in the TCB chain. Byte order is big-endian.

Last_ECB_Pointer: Last Event Control Block Pointer contains a data memory pointer to the location of the last ECB in the ECB chain. Byte order is big-endain.

Last_TIB_Pointer: Last Task Information Block Pointer contains a data memory pointer to the location of the last TIB on the TIB chain. Byte order is big-endian.

Last_PCB_Pointer: Last Pipe Control Block Pointer contains a data memory pointer to the location of the last PCB on the PCB chain. Byte order is big-endian.

Last_DMCB_Pointer: Last Data Memory Control Block Pointer contains a data memory pointer to the location of the last DMCB in the DMCB chain. Byte order is big-endian.

FIG. 9 Program Memory—Task Allocation Table: A Task Allocation Table is a set of pointers used to keep accurate track of the beginning of each memory block associated with a task's program code. TATs are read by the system initialization process. There are as many pointers in TATs as there are tasks installed in Program Memory. Each entry on a TAT consists of the following fields:·Tasks_Condition: This is a byte that indicates the initial operation condition associated with the task to which this TAT entry points. The condition may be SLEEP, to indicate that the task is not to be inserted in the Kernel's line of execution at system start time. Or it may be WAKE, to indicate that the task must be installed on the Kernel's line of execution upon system startup.

Task_Start_IP: Task Start Instruction Pointer is a set of three bytes that contain a program memory pointer to the location of a task's Task Header. Byte order is high, medium and low, where HIGH is the most significant byte, and LOW is the least significant byte.

FIG. 10 Program Memory—Task Header: A task's program code section starts with a Task Header (TH) that provides the system with basic information about the task. The following are the field contained in a Task Header:·Task_ID: Task Identifier contains the identifier of the task that owns this TH.

Status/Priority: initially contains the task's state information and assigned priority. Bits<7..6> correspond to state, and Bits<5..0> correspond to priority. State can be 11 for SUSPEND, or 10 for READY.

Task_Data_Memory_Size: Task Data Memory Size in bytes, contains the number of bytes that the assigned data memory block occupies.

Task Program Code: is the task's program code that is to be executed by the Kernel.

FIG. 11 Kernel Dispatcher General Flow Chart: This is the general algorithm performed by the Dispatcher and is described in detailed on the next figures.

FIG. 12 Kernel Port State Update: This control block is the first step of four steps carried out by the Dispatcher before yielding control to the active task. This subprocess includes reading and verification of input ports to the microprocessor, so that the appropriate event can be signaled when a change is detected on the associated input ports. Verification is done during every cycle in which the Dispatcher take control. This high frequency sensing enables the OS to detect events in high speed ports, achieving the best possible resolution.

The result is a mask of assignment and selection of input ports, which details the ports that must be monitored and those that need not be monitored. Ports that must be monitored are those that have been assigned to tasks as input ports. Ports that need not be monitored are those not assigned to any tasks, or assigned to tasks as output ports. If the input port events are active, they are reset.

Next, the resulting mask is examined. If it is all-zeros, then no port verification is necessary as not bits are programmed to generate events. All microprocessor ports are checked, and the result is masked with the mask resulting of block A to obtain the real value of the bits that are to be watched.

Finally, bit changes are detected by checking the current state mask with the mask corresponding to the natural state of bits. If a change occurred, the associated bit will be HIGH, otherwise it will be LOW. If the resulting mask is all-zeros, no changes occurred. Otherwise, it means that there were changes in the input ports. Accordingly, the event of Port_Change_Event is signaled.

FIG. 13 Kernel Task Stat Update: This control block is the second step that the Dispatcher must carry out before yielding control to the active task. This subprocess includes reading and verification of events, so that tasks in the WAIT state can be switched to the READY state if their expected events have occurred.

First, the pointer to the beginning of the TCB chain is retrieved. All TCBs in the TCB chain must be examined to acknowledge the state associated with every task. If a task is in the SUSPEND state, its state is not modified in this subprocess. The pointer to the next link in the TCB chain is obtained. If NULL, it means the entire TCB chain has been traversed.

Otherwise, the current task's state is checked. If READY, this means that the current task is not expecting any events. Its state is not modified. If WAIT, its associated event must be examined. Accordingly, the pointer to the beginning of the ECB chain is retrieved. All ECBs must be examined until the expected event is found. If the current ECB corresponds to the expected event, its state is examined. If it is signaled (activated), the state of the task in WAIT state must be updated to the READY state. If it is not signaled, the task's state is not modified.

If the end of the ECB chain is reached without finding the associated event, the system error flag is raised, indicating that a task is waiting for a non-existent event.

FIG. 14 Kernel Priority Task Ordering: This control block is the third step of four steps that the Dispatched carries out before yielding control to the active task. This subprocess selects the READY task that is to be switched to the ACTIVE state and given control of the system. The criteria used for task selection are task priority and the amount of time in which a task has been in the READY state.

First, the pointer to the beginning of the TCB chain is retrieved. The entire TCB chain must be traversed to examine all tasks that are in the READY state. The Max_Priority, Max_Wait_Time and Task_ID_Winner variables are initialized. These variables will contain the information of the task that wins the competition.

All tasks states are checked sequentially. If a task is not READY, the next task in the chain is checked. Once a READY task is found, its priority is checked against Max_Priority. If the found task's priority is higher, its associated information is stored in Max_Priority, Max_Wait_Time and Task_ID_Winner. Such task is considered the winner, thus far.

If the priority of the examined task is equal to Max_Priority, its time on the WAIT state is compared to Max_Wait_Time. If the current task's time on the WAIT state is higher, the values of Max_Wait_Time and Task_ID_Winner are updated to reflect the newly found winning task.

These steps are repeated until the last link in the TCB chain is found (i.e., when the TCB pointer equals NULL). The winning task is the one that is registered in the Task_ID_Winner register.

FIG. 15 Kernel Context and Control Restore: This control block is the last step of four that the Dispatcher must execute before yielding control to the active task. This subprocess restores the winning task's context variables and grants CPU control to the Parser. The Parser will resume execution of the active task's instructions.

First, the value of Task_ID_Winner is checked. If Task_ID_Winner is NULL, there are no active tasks to be executed. The Dispatcher thus maintains control.

If Tasks_ID_Winner is valid, a pointer to the start of the TCB chain is retrieved. The winner task's TCB must be found by traversing the TCB chain. If the end of the TCB chain is found (i.e., pointer equals NULL), the system error flag is raised indicating that the winner task's TCB does not exist.

If a valid TCB is found, the Parser's Instruction Pointer is assigned with the location of the winner task's next instruction to be executed. The task's state is switched to ACTIVE.

The data memory pointer is assigned to point to the beginning of the DMCB chain to search for the active task's DMCB by traversing the DMCB chain. Once the active task's DMCB is found, the data memory pointer is loaded with the active task's DMCB. (If NULL, it means that the end of the DMCB chain was found and no valid DMCB was found for the active task. Accordingly, the system error flag is raised to indicate that the active task does not own a valid DMCB.) Next, all context variables associated with the active task are restored. The Parser now gains control and starts executing the instructions beginning with the location pointed at by IP.

OPERATION OF INVENTION

SIOS Basis Structure Data Memory Structure Data Memory is organized in such a manner as to allow the Kernel and all tasks to coexist and operate correctly. It comprises two parts: a series of control block chains and a series of data memory blocks.

SIOS Basic Structure Program Memory Structure Program Memory is the memory that contains SIOS's program code. It comprises two sections: Task Allocation Table and Task Program Code.

SIOS Basic Structure Basic Functions: SIOS's basic functions are those that create actions required for the existence of the operating system, for its operation and the operation of tasks.

Basic functions are implemented in a language native to the underlying microprocessor. The function prototypes, the parameter it takes, and the values returned, are defined independently of the platform, thus allowing that code written for SIOS be easily ported to other platforms that use SIOS as their operating system.

SIOS basic functions are described next:

SIOS_Add_Task(TAT) This function adds a new task to the Kernel's execution process and assigns all data memory resources needed to execute the new task.

Parameters:—TAT.Task_Start_IP, pointer to actual task to be added, in the System_Pipe[0..PM_POINTER_SIZE-1]Returns: (nothing)Actions:—Creates a TCBoVerifies if there are TCB_SIZE bytes available in memory.

oTCB_Pointer[0..DM_POINTER_SIZE-1]=requests TCB_SIZE bytes of memory.

Initializes TCB with necessary values: oTCB.Task_ID=Task_IDoTCB.Stat_Pro=TH.Stat_PriooLast_TCB.Next_TCB[0..DM_POINTER_SIZE-1]=TCB_Pointer[0.. DM_POINTER_SIZE-1]oTCB.Next_TCB [0..DM_POINTER_SIZE-1]=NULLoLast_TCB[0..DM_POINTER_SIZE-1]=TCB_Pointer[0..DM_POINTER_SIZE-1]oTCB.Task_Start_IP [0..PM_POINTER_SIZE-1]=TAT[Task_ID].Task_Start_IP [0..PM_POINTER_SIZE-1] oTCB.Task_Next_IP [0..PM_POINTER_SIZE-1]=TCB.Task_Start_IP [0..PM_POINTER_SIZE- 1]oTCB.Ready_Wait_Time=0oTCB.Event_ID=NULL-Creates a DMCB and a TDMoVerifies if there are DMCB_SIZE bytes available in memory.

oVerifies if there are TH.TDM_Size bytes available in memory.

oDMCB_Pointer[0..DM_POINTER_SIZE-1]= Requests DMCB_SIZE bytes of memory.

oDMCB.Data_Memroy_Base_Address[0..DM_POINTER_SIZE-1]=Requests TH.TDM_Size bytes of memory.

Initializes DMCB and TDMoDMCB.Task_ID=Task_IdoDMCB.Data_Memroy_Size=TH.TDM_SizeoLast_DMCB.Next_DMCB[0..DM_POINTER_SIZE-1]= DMCB_Pointer[0.. DM_POINTER_SIZE-1]oLast_DMCB[0..DM_POINTER_SIZE-1]=DMCB_Pointer[0..DM_POINTER_SIZE-1]oTDM.Task_ID=Task_ID-Creates a TIBoVerifies that there are TIB_SIZE bytes available in memory.

oTIB_Pointer[0..DM_POINTER_SIZE-1]=Requests TIB_SIZE bytes of memory.

Initializes TIB with required values:oTIB.Task_ID= Task_IDoTIB.Mutex_ID=NULLoTIB.Pipe_ID= NULLoLast_TIB.Next_TIB[0..DM_POINTER_SIZE-1]=TIB_Pointer [0..DM_POINTER_SIZE-1]oLast_TIB [0..DM_POINTER_SIZE-1]=TIB_Pointer [0..DM_POINTER_SIZE-1]

SIOS_Suspend_Task()This functions suspends the execution of a task. All task control blocks remain valid, i.e., TCB, ECB, TIB, PIP, TDM.

Parameters: (non)Returns: (nothing)Actions:-Searches for TCBoTCB_Pointer=FIRST_TCB_POINTERoVerify that TCB.Task_ID=Task_IDoif not, TCB_Pointer= TCB.Next_TCBoRepeat search until appropriate TCB is found.

Updates TCBoTCB.Status=SUSPEND-Yields controloTDM.Context_Regs=Context_RegsoGoto KERNEL SIOS_Wake_Task(Task_ID) This function restores execution of a suspended task.

Parameters:-Task_ID, in System_Pipe[0]Returns: (nothing)Actions:-Searches for TCBoTCB_Pointer= FIRST_TCB_POINTERoVerify that TCB.Task_ID= Task_IDolf not, TCB_Pointer=TCB.Next_TCBoRepeat search until appropriate TCB is found.

Updates TCBoTCB.Status=READY-Yields controloGoto KERNELSIOS_Redispatch() This function yields CPU control to the Kernel. It is called by the task that wishes to yield control The task's state is switched to READY.

Parameters: (non)Returns: (nothing)Actions:-Searches for TCBoTCB_Pointer=FIRST_TCB_POINTERoCheck that TCB.Task_ID=Task_IDolf not, TCB_Pointer= TCB.Next_TCBoRepeat search until appropriate TCB is found.

Updates TCBoTCB.Status=READY-Yields controloTDM.Context_Regs=Context_RegsoGoto KERNEL SIOS_Wait_event(Event_ID, Event_Control) This functions switches a task into the WAIT state to wait for the specified event.

Parameters:-Event_ID, in System_Pipe[0]-Event_Control, in System_Pipe[1]. the event is assumed active when its value equals Event_Control.

Returns:(nothing)Actions:-Searches for TCBoTCB_Pointer=FIRST_TCB_POINTERoCheck that TCB.Task_ID=Task_IDolf not, TCB_Pointer=TCB.Next_TCBoRepeat search until appropriate TCB is found.

Updates TCBoTCB.Status=WAIToTCB.Event_ID= Event_IDoTCB.Event_Control=Event_Control-Yields controloTDM.Context_Regs=Context_RegsoGoto KERNEL SIOS_Create_Mutex(Task_ID) This function creates a Mutex in memory and updates the required variables.

Parameters:-Task_ID, the task that owns the mutex, in System_Pipe[0]Returns:- Mutex_ID, in System_Pipe[1] Actions:-Checks that there are ECB_SIZE bytes available in memory.

Creates an ECBoECB_Pointer[0..DM_POINTER_SIZE-1]=Requests ECB_SIZE bytes of memory.

Searches for a non-existing Mutex_ID to assign it to the new mutex.

Initializes ECBoECB.Event_ID=Mutex_IDoECB.Control_Stat=OFFoLast_ECB.Next_ECB [0..DM_POINTER_SIZE-1]=ECB_Pointer[0.. DM_POINTER_SIZE-1]oLast_ECB[0..DM_POINTER_SIZE-1]=ECB_Pointer[0.. DM_POINTER_SIZE-1]-Searches for TIB, using Task_IDoTIB_Pointer= FIRST_TIB_POINTERoChecks that TIB.Task_ID= Task_IDolf not, TIB_Pointer=TIB.Next_TCBoRepeat search until appropriate TIB is found.

Updates TIBoTIB.Mutex_ID=Mutex_ID

SIOS_Set_Mutex(Mutex_ID) Updates the mutex's state.

Parameters:-Mutex_ID, in System_Pipe[0]Returns: (nothing)Actions:-Searches for ECBoECB_Pointer= FIRST_ECB_POINTERoChecks that ECB.Event_ID= Event_IDolf not, ECB_Pointer=ECB.Next_ECBoRepeat search until appropriate ECB is found.

Upates ECBoECB.Control_Status=ON

SIOS_Clear_Mutex(Mutex_ID) Updates the mutex's state.

Parameters:Mutex_ID, in System_Pipe[0]Returns: (nothing)Actions:-Searches for ECBoECB_Pointer= FIRST_ECB_POINTERoChecks that ECB.Event_ID= Event_IDolf not, ECB_Pointer=ECB.Next_ECBoRepeat search until appropriate ECB is found.

Updates ECBoECB.Control_Status=OFF

SIOS_Create_Pipe(Pipe_Size) Creates a PCB in memory, reserves memory space for the Pipe, and updates the necessary pointers.

Parameters:-Pipe_Size, in System_Pipe[0]Returns:-Pipe_ID, in System_Pipe[1] Actions:-Checks that there are PCB_SIZE bytes available in memory.

Checks that there are Pipe_Size bytes available im memory.

Creates a PCBoPCB_Pointer[0..DM_POINTER_SIZE-1]=Requests PCB_SIZE bytes of memory-Searches for a non-existent Pipe_ID-Initializes PCBoPCB.Pipe_Base_Address[0..DM_POINTER_SIZE-1]=Requests Pipe_Size bytes of memory.

oPCB.Pipe_ID=Pipe_IdoPCB.Pipe$_{Size=Pipe\_}$SizeoLast_PCB.Next_PCB[0.. DM_POINTER_SIZE-1]=PCB_Pointer[0..DM_POINTER_SIZE-1]oLast_PCB [0.. DM$_{POINTER}$_SIZE-1]=PCB_Pointer[0..DM_POINTER$_{SIZE}$-1]

SIOS_Set_Pipe_Status(Pipe_ID, Pipe_Status) Updates a Pipe's state indicator.

Parameters:-Pipe_ID, in System_Pipe[0]-Pipe_Status, in System_Pipe[1]Returns: (nothing)Actions:-Searches for ECBoECB_Pointer=FIRST_ECB_POINTERoChecks that ECB.Event_ID=Pipe_IDolf not, ECB_Pointer= ECB.Next_ECBoRepeat search until an appropriate ECB is found.

Updates stateoECB.Event_Control=Pipe_Status

SIOS_Get_Pipe_Status(Pipe_ID) Updates a Pipe's state indicator.

Parameters:-Pipe_ID, in System_Pipe[0]Returns:-Pipe_Status, in System_Pipe[1] Actions:-Searches for ECBoECB_Pointer=FIRST_ECB_POINTERoChecks that ECB.Event_ID=Pipe_IDolf not, ECB_Pointer= ECB.Next_ECBoRepeat search until an appropriate ECB is found.

Read stateoPipe_Status=ECB.Event_Control.

SIOS_Send_Byte_To_Pipe(Pipe_ID, Pipe_Index, Byte_Value) Fills in the contents of a Pipe with one byte.

Parameters:-Pipe_ID, in System_Pipe[0]-Pipe_Index, in System_Pipe[1]-Byte_Value, in System_Pipe[2] Returns: (nothing)Actions:-Searches for PCBoPCB_Pointer=FIRST_PCB_POINTERoChecks that PCB.Pipe_ID=Pipe_IDolf not, PCB_Pointer=PCB.Next_PCBoRepeat search until an appropriate PCB is found.

Checks that the Pipe is not in use.

oPCB.Pipe_Control<>IN_USE-Updates Pipeo (PCB.Pipe_Base_Address+ Pipe_Inext)=Byte_ValueoPCB.Pipe_Control=IN_USE SIOS_Read_Byte_From_Pipe(Pipe_ID, Pipe_Index) Retrieves a byte from the contents of a Pipe.

Parameters:-Pipe_ID, in System_Pipe[0]-Pipe_Index, in System_Pipe[1]Returns:- Byte, in System_Pipe[2] Actions:-Searches for PCBoPCB_Pointer =FIRST_PCB_POINTERoChecks that PCB.Pipe_ID=Pipe_IDolf not, PCB_Pointer=PCB.Next_PCBoRepeat search until an appropriate PCB is found.

Read PipeoByte=(PCB.Pipe_Base_Address+Pipe_Index)

SIOS_Post_Port_Request(Request_Port_Mask) Sends message requesting exclusive access to digital Input/Output portsParameters:-Request_Port_Mask, in System_Pipe [0..PORT$_{_I\ BYTES}$-1]Returns: (nothing)Actions:-Searches for PIB of the Port_Manager taskoPCB_Pointer=PORT_MANAGER_PIPE_BASE_ADDRESS-Checks that the Pipe is not in use.

Updates Pipe's control state.

oPCB.Pipe_Control=PORT_REQUEST_POSTED

SIOS_Post_Port_Release(Release_Port_Mask) Sends message to release a digital I/O port.

Parameters:-Release_Port_Mask, in System_Pipe[0 ..PORT_BYTES-1]Returns: (nothing)Actions:-Searches for PIB of the Port_Manager taskoPCB_Pointer=PORT_MANAGER_PIPE_BASE_ADDRESS-Checks that the Pipe is not in use.

Updates Pipe's control state.

oPCB.Pipe_Control=PORT_RELEASE_POSTED

SIOS_Post_Port_Input_Setting(Input_Port_Mask) Sends request message to digital I/O ports selected as input ports so that port events may be generated in case of a change in their state.

Parameters:Input_Port_Mask, in System_Pipe [0..PORT_BYTES-1]Returns: (nothing) Actions:-Searches for PIB of the Port_Manager task.

oPCB_Pointer=PORT_MANAGER_PIPE_BASE_ADDRESS-Checks that Pipe is not in use.

Updates Pipe's control state.

oPCB.Pipe_Control=PORT_INPUT_SETTING_POSTED

SIOS_Post_Port_Idle_Setting(Idle_Port_Mask) Sends request message to digital I/O ports selected as input ports so that port events may be generated in case of a change in their state. A change is detected by comparing the current state of the port against the IDLE value that exists on the Pipe.

Parameters:-Idle_Port_Mask, in System_Pipe [0..PORT_BYTES-1]Returns: (nothing) Actions:-Searches for PIB of the Port_Manager task.

oPCB_Pointer=PORT_MANAGER_PIPE_BASE_ADDRESS-Checks that the Pipe is not in use.

Updates Pipe's control stateoPCB.Pipe_Control=PORT_IDLE_SETTING_POSTED

SIOS_Post_Port_Data (Port_Data_Value)Sends message requesting that data be put into digital I/O ports.

Parameters:-Port_Data_Value, in System_Pipe [0..PORT_BYTES-1]Returns: (nothing) Actions:-Searches for PIB of the Port_Manager task.

oPCB_Pointer=PORT_MANAGER_PIPE_BASE_ADDRESS-Checks that Pipe is not in use.

Updates Pipe's control state.

PCB.Pipe_Control=PORT_DATA_POSTED

SIOS_Post_Port_Read ()Sends message requesting that data be read from digital I/O ports.

Parameters: (non)Returns:-Port_Data_Value, in System_Pipe[0..PORT_BYTES-1] Actions:-Searches for PIB of Port_Manager task.

oPCB_Pointer=PORT_MANAGER_PIPE_BASE_ADDRESS-Checks that the Pipe is not in use.

Updates Pipe's control state.

oPCB.Pipe_Control=PORT_READ_POSTED

SIOS_Check_Free_Memory_Block(Block_Size) Checks the availability of a continous data memory block.

Parameters:-Block_Size, in System_Pipe[0]Returns:-YES/NO, in System_Pipe[1] Actions:-Compares Block_Size with Memory_Remainder SIOS_Read_Program_Memory)PM_Pointer, Block_Size, Pipe_ID) Read block of program memory and puts it into a Pipe.

Parameters:-PM_Pointer, in System_Pipe[0..PM_POINTER_SIZE-1]-Block_Size, in System_Pipe[PM_POINTER_SIZE]-Pipe_ID, in System_Pipe[PM_POINTER_SIZE+1]Returns: (nothing)Actions:-Searches for PCBoPCB_Pointer=FIRST_PCB_POINTERoChecks that PCB.Pipe_ID=Pipe_IDolf not, PCB_Pointer=PCB.Next_PCBoRepeat search until an appropriate PCB is found.

Checks that there is enough free space in the Pipe to store the data block.

oPCB.Pipe_Size>=Block_Size-Determines the type of memory to be read depending on the range of memory where the memory block to be read resides.

Select the appropriate reading procedure, according to the type of memory to be read.

Read bytes into program memory and put them into a Pipe.

SIOS_Logic_Function(Logic_Function, Buffer_Size, BufferA_Pointer, BufferB_Pointer) Carries out the specified logic function between two data buffers of same length.

Parameters:-Logic_Function, in System_Pipe[0]-Buffer_Size, in Sysem_Pipe[1]- BufferA_Pointer in System_Pipe[2..1+DM_POINTER_SIZE]-BufferB_Pointer, in System_Pipe[2+DM_POINTER_SIZE.. 1+2*DM_POINTER_SIZE]Returns:-Result is put into Buffer_AActions:-Determines what function is to be carried out.

Reads bytes from both buffers.

Executes function using read bytes as parameters.

Stores results in the byte in buffer_A.

SIOS_ADD_Function(Buffer_Size, BufferA_Pointer, BufferB_Pointer) Executes an arithmetic ADD between two data buffers of same length.

Returns:-Results goes into Buffer_AParameters:-Buffer_Size, in System_Pipe[0]- BufferA_Pointer, in System_Pipe[1.. DM_POINTER_SIZE]-BufferB_Pointer, in System_Pipe [DM_POINTER_SIZE+1..2*DM_POINTER_SIZE]Actions:-Reads bytes from each buffer, starting with the smallest index.

Executes ADD between read bytes (taking CARRY into consideration)-Stores results in Buffer_A byte.

SIOS_SUB_Function(Buffer_Size, BufferA_Pointer, BufferB_Pointer) Executes an arithmetic SUB (subtraction) between two data buffers of same length.

Parameters:-Buffer_Size, in System_Pipe[0 -BufferA_Pointer, in System_Pipe[1.. DM_POINTER_SIZE]-BufferB_Pointer, in System_Pipe[DM_POINTER_SIZE+1..2* DM_POINTER_SIZE]Returns:-Results goes into Buffer_AActions:-Reads bytes from each buffer, starting with the smallest index.

Executes SUB between read bytes (taking CARRY into consideration)-Stores results in Buffer_A byte.

CONCLUSION, RAMIFICATIONS AND SCOPE OF INVENTION

Thus, the reader will see that SIOS is a multitasking operating system capable of operating on low processing power platforms, such as 8-bit microprocessors. In addition, the memory resources it requires for full functionality are very reduced so as to permit the concurrent execution of operating system functions and application task within the same microprocessor memory space. The simplicity of presented algorithms facilitates the ready implementation of SIOS on several different microprocessor platforms.

While our above description contains many details, these should not be construed as limitations to the scope of the invention, but rather as an exemplification of one preferred embodiment thereof. Obviously, modifications and alterations will occur to others upon a reading and understanding of this specification. For example, a higher degree of robustness can be achieved using a dynamic task priority scheme so that low priority tasks need not wait for a long time even if high-priority task are present. The dynamic priority scheme can augment the priority of low priority tasks as wait time increases. Eventually, low priority tasks will acquire higher priorities and receive control.

In addition, the OS can be further equipped with a high priority task that implements an external communication buffer that allows the existence of a command line style-like interface. Using such interface, a user could tell the OS to carry out specific actions, such as task activation and deactivation, read memory blocks, update task program code, monitoring of system error flags, modify the state of an event, and many others. The description above is intended, however, to include all such modifications and alterations insofar as they come within the scope of the appended claims or the equivalents thereof.

What is claimed is:

1. A method for architecture for a multitasking operating system, the method comprising the steps of: a) a processing Kernel b) controlling the execution of each task with a task control block with every task comprises one block and with a plurality of task control blocks consisting of the group of Task Information Block, the Event Control Block, the Pipe Control Block, the Data Memory Control Block, Task Control Block, Task Data Memory, Port Information Block, arranged in a dynamic chain and containing the following fields: i) Task Identifier which contains the identifier of the task and initialized when the task is installed into the Kernel's line of execution; ii) Status/Priority field which contains the task's state and priority information and is fixed when the task is installed on the Kernel's line of execution; iii) a Task Next Instruction Pointer which stores a pointer to Program Memory where the next instruction associated with the task and update every time a task yield control to the Kernel; iv) a Task Start Instruction Pointer that contains the pointer to Program Memory where the first instruction associated with the task and is installed in the Kernel's line of execution with the value indicated by a Task Header; v) a Ready_Wait_Time field which is the task waiting time in Ready State which value is updated by the Kernel; vi) an Event Identifier that contains the event identifier for which a task is waiting to switch from the WAIT to the READY state and which is updated when the task waits for an event; vii) an Event Control field that contains the event control value that shows that an event is active and is updated when a task starts its wait for an event; viii) a Next Task Control Block Pointer that contains the pointer to Data Memory of the next Task Control Block in the dynamic chain of Task Control Blocks, if the value is NULL, it means that there are not other Task Control Blocks on the dynamic chain; c) Controlling events associated with a task using a Task Information Block with every task comprising one block and with a plurality of Task Information Blocks arranged in a dynamic chain and with containing the following fields: i) a Task Identifier that contains the identifier to the corresponding task and is set when the task is installed in the Kernel's line of execution; ii) a Pipe Identifier that contains a pointer to the Pipe that a task uses for communication purposes, if it has a NULL value it means the task has not been assigned the Pipe and is initialized when a task request the Pipe; iii) a Mutual Exclusion Identifier contains the identifier of the mutually exclusive event that a task owns, if the value is NULL then no mutually exclusive event has been assigned to the task and it is initialized when a task request a mutually exclusive event; and iv) a Next Task Information Block Pointer that contains a data memory pointer to the next Task Information Block Task Information Block chain, if the value if NULL, it means no next Task Information Block exists in the chain and it is updated by the Kernel when the current next Task Information Block is the last on the next Task Information Block chain and a new next Task Information Block is created; d) Controlling events associated with a task using a Event Control Block with every event comprising one block and with a plurality of Event Control Blocks arranged in a dynamic chain and with the following fields: i) an Event Identifier that contains the identifier of the event being expected by a task so that it can switch from the WAIT to the READY task state and is initialized when an event is created; ii) an event's "Control & Status" field contains information about the event, it is updated by the task that controls the event and is watched by the Kernel to decide whether an event has been signaled by comparing it with the event's Event_Control field within the Task Control Block; iii) a Next Event Control Block Pointer that contains the data memory pointer to the next Event Control Block in the Event Control Block chain and it is updated by the Kernel when the current Event Control Block is the last on the Event Control Block chain and a new Event Control Block is created; e) Controlling a task's communication pipes with a Pipe Control Block with every pipe comprising one block and with a plurality of Pipe Control Blocks arranged in a dynamic chain; i) a Pipe Identifier which contains the identifier of the Pipe created on memory; ii) a Pipe Data Memory Base Address contains a data memory pointer to the first byte on the Pipe and is initialized when the Pipe is created; iii) a Pipe Size field contains the number of data memory bytes that a Pipe occupies and is initialized when the Pipe is created; and iv) a Next Pipe Control Block Pointer field contains a data memory pointer to the next Pipe Control Block in the dynamic chain of Pipe Control Blocks, if this field is NULL, it means there is no next Pipe Control Block on the dynamic chain and the value is updated by the Kernel when the current Pipe Control Block is the last on the Pipe Control Block chain a new Pipe Control Block is created; f) Managing memory assigned to a task with a Data Memory Control Block with a plurality of Data Memory Control Blocks arranged in a chain and containing the following fields; i) a Task Identifier field which contains the identifier of the task, it is initialized when the block is created when the task is installed on the Kernel's line of execution; ii) a Task Data Memory Base Address is a data memory pointer to the first byte in the memory block assigned to a task and are initialized when Task Memory Data is assigned; and iii) Task Data Memory Size which contains the number of data memory bytes of the assigned memory block and is initialized when the block is created; iv) a Next Task Data Memory Control Block Pointer is a data memory pointer to the next Data Memory Control Block in the Data Memory Control Block chain, if it has a NULL value, it means no next Data Memory Control Block exists and is updated by the kernel when the current Data Memory Control Block is the last Data Memory Control Block on the Data Memory Control Block chain and a new Data Memory Control Block is created g) Task Data Memory blocks which are data memory blocks associated with each task in which a task's Task Data Memory block stores its context on one Task Data Memory block before yielding computer means handling to the Kernel and has the following fields; i) a Task Identifier contains the identifier of the task and is initialized when the block is created when the task is installed on the Kernel's line of execution; ii) a plurality of task context registers; and iii) a plurality of task data registers, j) Port Information Blocks which are memory blocks used to handle a microprocessor mean's input and output ports and containing the following fields; i) an Assignation_Port_Mask field that contains information of microprocessor mean's inputs/outputs ports assigned to tasks; ii) a Input_Selection_Mask contains information of the direction of communications in inputs/outputs ports; and iii) a Change_State field that contains information related to a change in the value of the microprocessor's inputs/outputs bits; k) the Kernel use Kernel Control Registers which are used to store required operation data and containing the following fields; i) a Free Data Memory Remainder field that contains the number of free bytes in data memory; ii) a Max_Priority register that stores the maximum priority assigned to a task used in the process of searching for the READY task with highest priority; iii) a Max_Wait_Time register that stores the maximum wait time associated with a task and used in the process of searching for the READY task with the highest priority; iv) a Task_ID_Winner identifier which is the READY task of highest priority; v) an Instruction Pointer to program memory that contains the current instruction that is to be decoded by the Parser; vi) a Task Control Block Pointer which is a data memory pointer to the location of the current Task Control Block; vii) an Event Control Block Pointer which is a data memory pointer to the location of the current Event Control Block; viii) a Data Memory Control Block Pointer which is a data memory pointer to the location of the current Data Memory Control Block; ix) a Task Information Block Pointer which is a data memory pointer to the current Task Information Block; x) a Pipe Control Block Pointer which is a data memory pointer to the location of the current Pipe Control Block; xi) a Last Task Control Block Pointer which is a data memory pointer to the location of the last Task Control Block in the Task Control Block chain; xii) a Last Event Control Block Pointer which is a data memory pointer to the location of the last Event Control Block in the Event Control Block chain; xiii) a Last Task Information Block Pointer which is a data memory pointer to the location of the last Task Information Block on the Task Information Block chain; xiv) a Last Pipe Control Block Pointer which is a data memory pointer to the location of the last Pipe Control Block on the Pipe Control Block chain; and xv) a Last Data Memory Control Block Pointer which is a data memory pointer to the location of the last Data Memory Control Block in the Data Memory Control Block chain; l) a plurality of Task Allocation Table which are tables of pointers that accurately identify the beginning of the memory blocks associated with a task and containing the following fields; i) a Task_Condition field which indicates the initial operation condition associated with the task that a Task Allocation Table entry points with the possible conditions of SLEEP, to indicate that the task is not to be inserted in the Kernel's line of execution at system start time and WAKE, to indicate that the task must be installed on the Kernel's line of execution upon system startup; and; ii) a Task Start Instruction Pointer which is a program memory pointer to the location of a task's Task Header; k) Starting a task's program code section with a Task Header which provides basic information about the task and contains the following fields; i) a Task Identifier contains the identifier of the task; ii) a Status/Priority field that contains the task's state information and assigned priority; iii) a Task Data Memory Size field that contains the number of bytes that the assigned data memory block occupies; and iv) the Task Program Code which is the task's program code that is to be executed by the Kernel; m) a Port Stat Update control block process which carries out reading and verification of a microprocessor's input ports to set up port events, which can be signaled when the state of an input port changes; n) a Task State Update control block process which carries out reading and verification of events of update the state of tasks on the WAIT state and switch them to the READY state if their expected event is signaled including the following steps: i) the pointer positioned to the beginning of the Task Control Block chain retrieved with all the Task Control Blocks in the Task Control Block chain and examining the state associated with every task; ii) Checking to see if a task is in the SUSPEND state, if it is then its state is not modified in this process and the task control block pointer to the next link in the Task Control Block chain if the next link is NULL then it is the end of the chain; iii) Checking to see if a task is in READY state, if it is this means that the current task is not expecting any events; iv) Checking to see if a task is in WAIT state, if it is then the associated event must be examined, the pointer to the beginning of the Event Control Block chain is retrieved and examine until the expected event is found, if the current Event Control Block corresponds to the event, its state is examined, if it is activated then the state of the task in WAIT state is changed to a READY state, if the end of the Event Control Block chain is reached without finding the event, a system error is flagged; o) a Priority Task Ordering process which selects the task in the READY state that is to be switched to the ACTIVE state using the follow criteria the task priority and the amount of time in which a task has been in the READY state using the following steps: i) retrieving the pointer from the beginning of the Task Control Block; ii) examining all the tasks in the Task Control Block that are in the READY state; iii) initializing the max_priority, max_wait_time and task_id_winner fields; iv) checking sequentially all task states, if a task is not READY, the next task in the chain is checked, if a task is READY its priority is checked against Max_Priority, if the task's priority is higher, store task's data in the Max_Priority, Max_Wait_Time and Task_ID_Winner; if the task's priority is equal to the Max_Priority field, then compare the task's time on the WAIT state to the Max_Wait_Time field, if the current task's time on the WAIT state is higher, store task's data in the Max_Priority, Max_Wait_Time and Task_ID_Winner; and v) repeating the previous step until the last link in the Task Control Block chain is examined, and a Context and Control Restore process which executes the restoration of all context variables associated with the active task and yields computer means control to a Parser, which continues the execution of the active task's instructions.

2. A system for architecture for a multitasking operating system, comprising: a) a processing Kernel, b) controlling the execution of each task with a task control block with every task comprises one block and with a plurality of task control blocks consisting of the group of Task Information Block, the Event Control Block, the Pipe Control Block, the Data Memory Control Block, Task Control Block, Task Data Memory, Port Information Block, arranged in a dynamic chain and containing the following fields: i) Task Identifier which contains the identifier of the task and initialized when the task is installed into the Kernel's line of execution; ii) Status/Priority field which contains the task's state and priority information and is fixed when the task is installed on the Kernel's line of execution; iii) a Task Next Instruction Pointer which stores a pointer to Program Memory where the next instruction associated with the task and updated every time a task yield control to the Kernel; iv) a Task Start Instruction Pointer that contains the pointer to Program Memory where the first instruction associated with the task and is installed in the Kernel's line of execution with the value indicated by a Task Header; v) a Ready_Wait_Time field which is the task waiting time in Ready State which value is updated by the Kernel; vi) an Event Identifier that contains the event identifier for which a task is waiting to switch from the WAIT to the READY state and which is updated when the task waits for an event; vii) an Event Control field that contains the event control value that shows that an event is active and is updated when a task starts its wait for an event; viii) a Next Task Control Block Pointer that contains the pointer to Data Memory of the next Task Control Block in the chain of Task Control Blocks, if the value is NULL, it means that there are not other Task Control Blocks on the chain c) Controlling events associated with a task using a Task Information Block with every task comprising one block and with a plurality of Task Information Blocks arranged in a dynamic chain and with containing the following fields; i) a Task Identifier that contains the identifier to the corresponding task and is set when the task is installed in the Kernel's line of execution; ii) a Pipe Identifier that contains a pointer to the Pipe that a task uses for communication purposes, if it has a NULL value it means the task has not been assigned the Pipe and is initialized when a task requests the Pipe; iii) a Mutual Exclusion Identifier contains the identifier of the mutually exclusive event that a task owns, if the value is NULL then no mutually exclusive event has been assigned to the task and it is initialized when a task requests a mutually exclusive event; and iv) a Next Task Information Block Pointer that contain a data memory pointer to the next Task Information Block Task Information Block chain, if the value is NULL, it means no next Task Information Block exists in the chain and it is updated by the Kernel when the current next Task Information Block is the last on the next Task Information Block chain and a new next Task Information Block is created; d) Controlling events associated with a task using a Event Control Block with every event comprising one block and with a plurality of Event Control Blocks arranged in a dynamic chain and with the following fields; i) an Event Identifier that contains the identifier of the event being expected by a task so that it can switch from the WAIT to the READY task state and is initialized when an event is created; ii) an event's "Control & Status" field contains information about the event, it is updated by the task that controls the event and is watched by the Kernel to decide whether an event has been signaled by comparing it with the event's Event_Control field within the Task Control Block; iii) a Next Event Control Block Pointer that contain the data memory pointer to the next Event Control Block in the Event Control Block chain and it is updated by the Kernel when the current Event Control Block is the last on the Event Control Block chain and a new Event Control Block is created; e) Controlling a task's communication pipes with a Pipe Control Block with every pipe comprising one block and with a plurality of Pipe Control Blocks arranged in a dynamic chain; i) a Pipe Identifier which contains the identifier of a Pipe created on memory; ii) a Pipe Data Memory Base Address contain a data memory pointer to the first byte on the Pipe and is initialized when the Pipe is created; iii) a Pipe Size field contains the number of data memory bytes that a Pipe occupies and is initialized when the Pipe is created; and iv) a Next Pipe Control Block Pointer field contains a data memory pointer to the next Pipe Control Block in the chain of Pipe Control Blocks, if this field is NULL, it means there is no next Pipe Control Block on the chain and the value is updated by the Kernel when the current Pipe Control Block is the last on the Pipe Control Block chain a new Pipe Control Block is created; f) Managing memory assigned to a task with a Data Memory Control Block with a plurality of Data Memory Control Blocks arranged in a chain and containing the following fields; i) a Task Identifier which contains the identifier of the task, it is initialized when the block is created when the task is installed on the Kernel's line of execution; ii) a Task Data Memory Base Address is a data memory pointer to the first byte in the memory block assigned to a task and are initialized when Task Memory Data is assigned; and iii) Task Data Memory Size which contains the number of data memory bytes of the assigned memory block and is initialized when the block is created; iv) a Next Task Data Memory Control Block Pointer is a data memory pointer to the next Data Memory Control Block in the Data Memory Control Block chain, if it has a NULL value, it means no next Data Memory Control Block exists and is updated by the kernel when the current Data Memory Control Block is the last Data Memory Control Block on the Data Memory Control Block chain and a new Data Memory Control Block is created, g) a Task Data Memory blocks which are data memory blocks associated with each task in which a task's Task Data Memory block stores its context on one Task Data Memory block before yielding computer means handling to the Kernel and has the following fields; i) a Task Identifier contains the identifier of the task and is initialized when the block is created when the task is installed on the Kernel's line of execution; ii) a plurality of task context registers; and iii) a plurality of task data registers; j) Port Information Block which are memory blocks used to handle a microprocessor mean's input and output ports and containing the following fields; i) an Assignation_Port_Mask field that contains information of microprocessor mean's inputs/outputs ports assigned to tasks; ii) a Input_Selection_Mask contains information of the direction of communications in inputs/outputs ports; and iii) a Change_State field that contains information related to a change in the value of the microprocessor's inputs/outputs bits; k) the Kernel use Kernel Control Registers which are used to store required operation data and containing the following fields; i) a Free Data Memory Remainder field that contains the number of free bytes in data memory; ii) a Max_Priority register that stores the maximum priority assigned to a task used in the process of searching for the READY task with highest priority; iii) a Max_Wait_Time register that stores the maximum wait time associated with a task and used in the process of searching for the READY task with the highest priority; iv) a Task_ID_Winner Identifier which is the READY task of highest priority; v) an Instruction Pointer to program memory that contains the current instruction that is to be decoded by the Parser; vi) a Task Control Block Pointer which is a data memory pointer to the location of the current Task Control Block; vii) an Event Control Block Pointer which is a data memory pointer to the location of the current Event Control Block; viii) a Data Memory Control Block Pointer which is a data memory pointer to the location of the current Data Memory Control Block; ix) a Task Information Block Pointer which is a data memory pointer to the current Task Information Block; x) a Pipe Control Block Pointer which is a data memory pointer to the location of the current Pipe Control Block; xi) a Last Task Control Block Pointer which is a data memory pointer to the location of the last Task Control Block in the Task Control Block chain; xii) a Last Event Control Block Pointer which is a data memory pointer to the location of the last Event Control Block in the Event Control Block chain; xiii) a Last Task Information Block Pointer which is a data memory pointer to the location of the last Task Information Block on the Task Information Block chain; xiv) a Last Pipe Control Block Pointer which is a data memory pointer to the location of the last Pipe Control Block on the Pipe Control Block chain; and xv) a Last Data Memory Control Block Pointer which is a data memory pointer to the location of the last Data Memory Control Block in the Data Memory Control Block chain; l) a plurality of Task Allocation Table which are tables of pointers that accurately identify the beginning of the memory blocks associated with a task and containing the following fields; i) a Task_Condition field which indicates the initial operation condition associated with the task that a Task Allocation Table entry points with the possible conditions of SLEEP, to indicate that the task is not to be inserted in the Kernel's line of execution at system start time and WAKE, to indicate that the task must be installed on the Kernel's line of execution upon system startup; and ii) a Task Start Instruction Pointer which is a program memory pointer to the location of a task's Task Header; k) Starting a task's program code section with a Task Header which provides basic information about the task and contains the following fields; i) a Task Identifier contains the identifier of the task; ii) a Status/Priority field that contains the task's state information and assigned priority; iii) a Task Data Memory Size field that contains the number of bytes that the assigned data memory block occupies; and iv) the Task Program Code which is the task's program code that is to be executed by the Kernel; and m) a Port State Update control block process which carries out reading and verification of a microprocessor's input ports to set up port events, which can be signaled when the state of an input port changes; n) a Task State Update control block process which carries out reading and verification of events to update the state of tasks on the WAIT state and switch them to the READY state if their expected event is signaled including the following steps: i) the pointer to the beginning of the Task Control Block chain retrieved with all the Task Control Blocks in the Task Control Block chain and examining the state associated with every task; ii) Checking to see if a task is in the SUSPEND state, if it is then its state is not modified in this process and the task control block pointer points to the next link in the Task Control Block chain if the next link is NULL then it is the end of the chain; iii) Checking to see if a task is in READY state, if it is this means that the current task is not expecting any events; iv) Checking to see if a task is in WAIT state, if it is then the associated event must be examined, the pointer to the beginning of the Event Control Block chain is retrieved and examine until the expected event is found, if the current Event Control Block corresponds to the event, its state is examined, if it is activated then the state of the task in WAIT state is changed to a READY state, if the end of the Event Control Block chain is reached without finding the event, a system error is flagged; o) a Priority Task Ordering process which selects the task in the READY state that is to be switched to the ACTIVE state using the follow criteria the task priority and the amount of time in which a task has been in the READY state using the following steps: i) retrieving the pointer from the beginning of the Task Control Block; ii) examining all the tasks in the Task Control Block that are in the READY state; iii) initializing the max_priority, max_wait_time and task_id_winner fields; iv) checking sequentially all task states, if a task is not READY, the next task in the chain is checked, if a task is READY its priority is checked against Max_Priority, if the task's priority is higher, store task's data in the Max_Priority, Max_Wait_Time and Task_ID_Winner; if the task's priority is equal to the Max_Priority field, then compare the task's time on the WAIT state to the Max_Wait_Time field, if the current task's time on the WAIT state is higher, store task's data in the Max_Priority, Max_Wait_Time and Task_ID_Winner; and v) repeating the previous step until the last link in the Task Control Block chain is examined, and a Context and Control Restore process which executes the restoration of all context variables associated with the active task and yields computer means control to a Parser, which continues the execution of the active task's instructions.

* * * * *